N. E. SALSICH.
RAIL JOINT.
APPLICATION FILED JUNE 19, 1922.
1,432,305.
Patented Oct. 17, 1922.
2 SHEETS—SHEET 1.
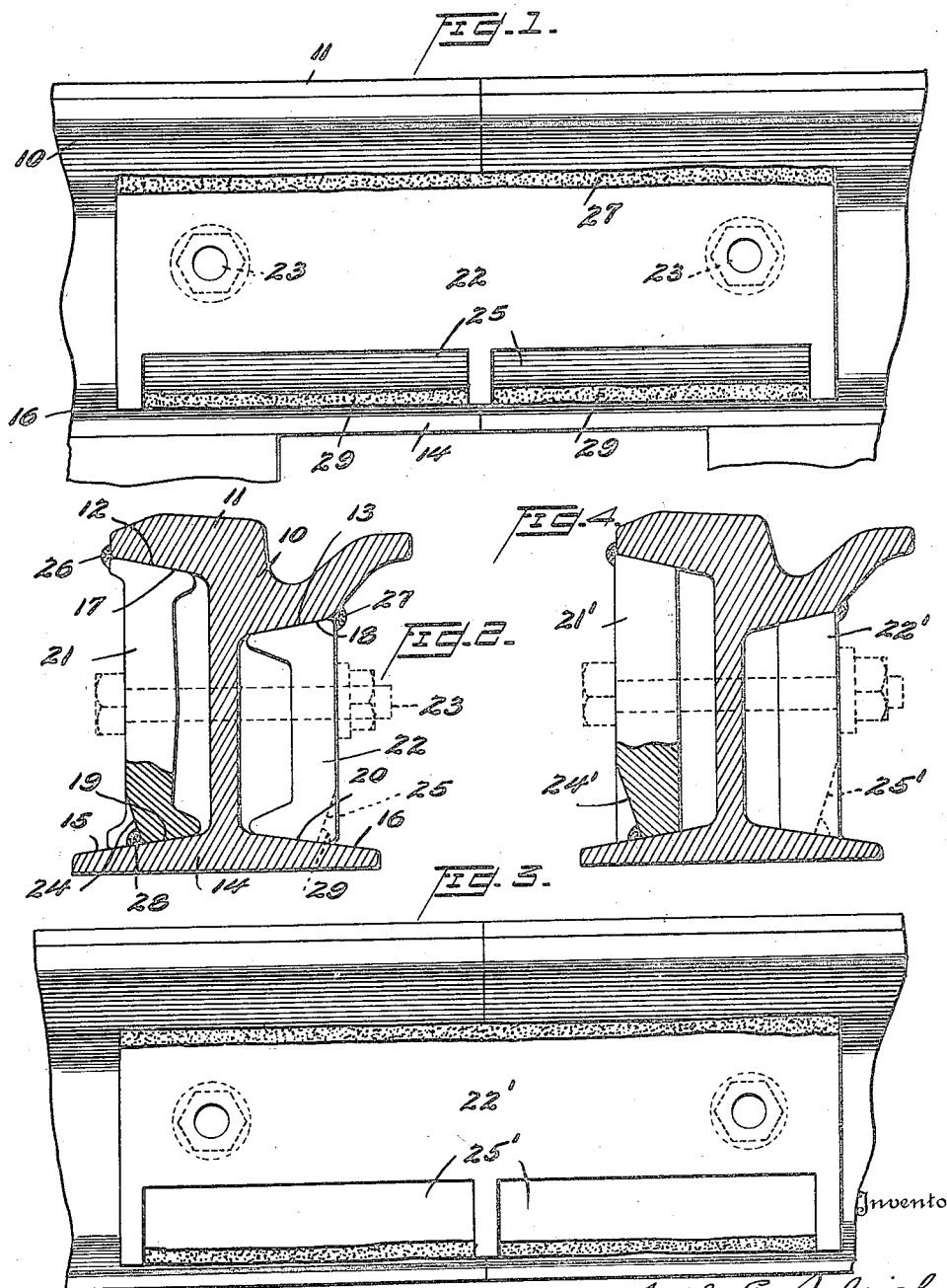

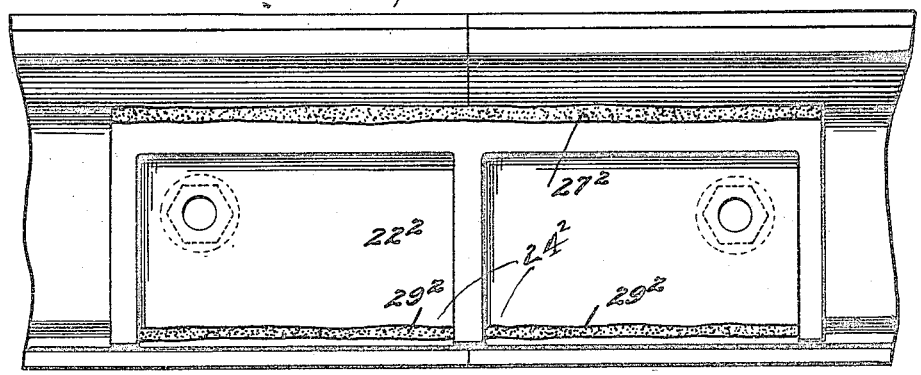
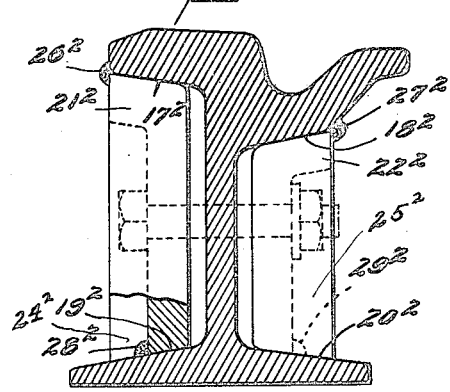
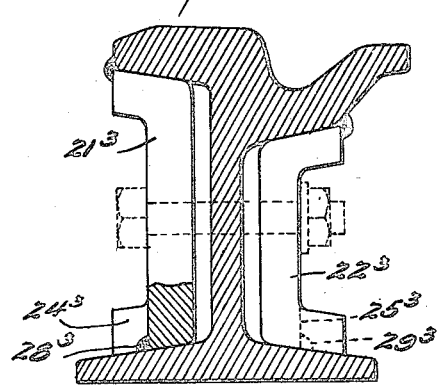
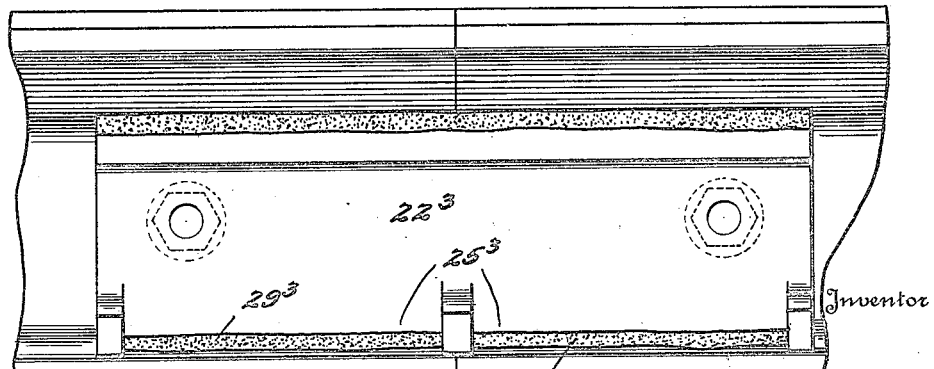

Patented Oct. 17, 1922.

1,432,305

UNITED STATES PATENT OFFICE.

NEIL E. SALSICH, OF BETHLEHEM, PENNSYLVANIA.

RAIL JOINT.

Application filed June 19, 1922. Serial No. 569,269.

*To all whom it may concern:*

Be it known that I, NEIL E. SALSICH, a citizen of the United States, residing at Bethlehem, Lehigh County, and State of Pennsylvania, have invented certain new and useful Improvements in Rail Joints, of which the following is a specification.

The present invention relates to rail joints and particularly to rail joints in which the rail ends are connected by splice plates welded thereto or secured in position by bolts in combination with welds.

It is found in welding splice bars to rails, in the joining of rail ends, that the heat incident to the welding operation frequently injures the metal of the rail, particularly the base of the rail which is relatively thin and more susceptible to injury of this character than other portions thereof. The rail base of the modern girder rail tapers outwardly in cross section in each direction from the central web, that is, it becomes thinner as the distance from the web increases. Generally, in joining the ends of such rails by welding, the splice plates are arranged to bear upon the inclined upper surfaces of the rail base and the inclined lower surfaces of the rail head, the upper edge of the splice plate being welded to the head of the rail, and the lower portion of the splice plate being welded to the upper surface of the base of the rail.

It is desirable to have the upper weld as remote as possible from the web of the rail and to have the lower weld as close as possible to the web of the rail. At the same time the splice plates should be designed and constructed so as to center themselves or arrange themselves with their webs substantially parallel to the webs of the rails when the plates are drawn into position by tightening the connecting bolts.

The improved splice plates hereinafter described in detail and illustrated in the accompanying drawings meet the theoretical requirements by being formed with top and bottom bearing surfaces which also constitute guiding surfaces for centering the plates during assembly, and are so shaped that their lower outer edges are displaced inwardly relatively to their upper outer edges so that welding material deposited along such lower edges is relatively close to the web of the rail and the material deposited along its outer upper edges relatively distant therefrom. The lower weld is made at a point where the rail base is relatively thick and well able to withstand the welding heat.

In the drawings;

Figs. 1 and 2 show in side elevation and in cross section respectively one form of rail joint embodying the invention. Figs. 3 and 4 are similar views of a modified form of joint. Figs. 5 and 6 are similar to Figs. 1 and 2 and showing a second modification of the joint, and Figs 7 and 8 are similar views of a third modification.

The rail ends indicated at 10 are of girder rails such as generally used in street railway lines and the splice plates illustrated are designed particularly for use in connection with such rails, but it will be understood that the invention is equally applicable to other forms of rails and may be embodied in other forms of splice plates especially adapted for use with such rails.

The head 11 of the rail has inclined lower surfaces 12 and 13 respectively and the base 14 is of the usual shape, having downwardly and outwardly sloping upper surfaces 15 and 16 respectively. The pairs of bearing surfaces 12 and 15 and 13 and 16 converge inwardly and constitute seats for the corresponding upper and lower bearing surfaces 17, 18, 19 and 20 respectively of the splice bars 21 and 22. A bolt 23 passes through the rail web and splice bars and is adapted not only to draw these bars toward the web in assembling but to maintain them in position during the welding operation. The splice bar 21 is substantially T shaped at its top and bottom while the splice bar 22 is substantially channel shaped, having no laterally extending flanges at its outer edges. Portions of both bars 21 and 22 are cut away along their lower outer edges, bar 21 being cut away along the inclined plane 24 and bar 22 along the inclined plane 25, the portions not thus cut away constituting feet which make contact with the rail ends and assist in guiding the plate during assembly. Welding material is indicated at 26, 27, 28 and 29, these ribs or strips extending longitudinally and serving to rigidly secure the upper and lower edges of the splice bars to the heads and bases of the rails respectively. It will be seen that, due to the fact that the lower edges of the splice bars are displaced inwardly relatively to the upper edges, the lower welds 28 and 29 are about midway between the edges of the base and the central web 10 while the upper welds are at the outer edges of the head. The metal of the base at the lower welds is of sufficient thickness to withstand the welding heat and the edges of the base outside of the welds will not split or crack off from the body of the rail after welding, due to traffic strains, as has frequently occurred in prior constructions.

In Figs. 3 and 4 the splice plates 22' are not provided with flanges as in Figs. 1 and 2 but are cut away along planes 24' and 25' in the same manner as in Figs. 1 and 2.

In Figs. 5 and 6 a second modification is illustrated, the splice plates $21^2$ and $22^2$ being shown provided with upper and lower inclined bearing surfaces $17^2$, $18^2$, $19^2$, and $20^2$ so that the plates will properly center themselves when the bolts are tightened, the outer surfaces of the plates being recessed at $24^2$ and $25^2$ respectively. The upper welds are indicated at $26^2$ and $27^2$ and the lower welds at $28^2$ and $29^2$. In Figs. 7 and 8 the splice bars $21^3$ and $22^3$ are formed as channels with inclined upper and lower bearing surfaces so as to be self-centering with the lower flanges of the channels cut away at $24^3$ and $25^3$ respectively to provide spaces for the welds $28^3$ and $29^3$ so that the lower welds are displaced inwardly relatively to the upper welds.

It will be seen that in each of the several modifications the splice bars are self-centering in that each has upper and lower bearing surfaces to guide it into position with its web parallel to the rail webs as the bolts are tightened, and that in each instance the upper welds are as remote as possible from the web of the rail while the lower welds are as close as possible to the web. Maximum efficiency of the joint is thus realized.

Having thus described my invention, what I claim as new and desire to secure by Letters Patent is:

1. A splice plate for a rail joint having upper and lower surfaces adapted to bear against the heads and bases respectively of abutting rail ends and to be thereby positioned substantially parallel to and spaced from the webs of the rails with its longitudinal upper and lower outer edges positioned to be welded to the rail, said plate being formed with a portion of its lower outer edge displaced inwardly relatively to its upper outer edge, so that welding material deposited along said lower edge will be relatively close to the webs of the rails and welding material deposited along its outer upper edge relatively distant therefrom.

2. A splice plate for a rail joint having upper and lower inclined inwardly converging bearing surfaces adapted to bear against the heads and bases respectively of abutting rail ends and to be thereby positioned substantially parallel to and spaced from the webs of the rails with its upper and lower longitudinal outer edges positioned to be welded to the rail, said plate being formed with a portion of its lower outer edge displaced inwardly relatively to its upper outer edge, so that welding material deposited along said lower edge will be relatively close to the web of the rail and welding material deposited along its outer upper edge relatively distant therefrom the portion of said lower outer edge not so displaced constituting a foot adapted to make contact with the base of a rail and to act as a guide.

3. A splice plate for a rail joint having upper and lower inwardly directed flanges provided with surfaces adapted to bear against the heads and bases respectively of abutting rail ends and to be thereby positioned substantially parallel to and spaced from the webs of the rails with its upper and lower outer edges positioned to be welded to the rail, said plate being formed with a portion of its lower outer edge displaced inwardly relatively to its upper outer edge, so that welding material deposited along said lower edge will be relatively close to the webs of the rails and welding material deposited along its outer upper edge relatively distant therefrom.

4. A rail joint comprising abutting rail ends and splice plates overlapping the rail ends and positioned on opposite sides of the rails, said plates having upper and lower surfaces adapted to bear against the heads and bases respectively of the rails, and to be thereby positioned substantially parallel to and spaced from the rail webs with their upper and lower outer edges disposed to be welded to the rail, said plates being formed with portions of their lower outer edges displaced inwardly relatively to their upper outer edges so that welding material deposited along said lower edges will be relatively close to the webs of the rails and welding material deposited along their outer upper edges relatively distant therefrom the portions of said lower outer edges not so displaced constituting feet which make contact with the bases of the rail ends and act as guides.

5. A rail joint comprising abutting rail ends, and splice plates overlapping the rail ends and on opposite sides of the rails, said plates having upper and lower outwardly directed flanges provided with surfaces to bear against the heads and bases of the rails respectively and to be thereby positioned substantially parallel to and spaced from the rail webs with the upper and lower outer edges of the plates disposed to be welded to the rails, said plates being formed with portions of their lower outer edges displaced inwardly relatively to their upper outer edges, so that welding material deposited along said lower edges will be relatively close to the webs of the rails and welding material deposited along their outer upper edges relatively distant therefrom.

In testimony whereof I hereunto affix my signature.

NEIL E. SALSICH.